(12) United States Patent
Zantedeschi et al.

(10) Patent No.: US 11,794,455 B2
(45) Date of Patent: Oct. 24, 2023

(54) PROCESS FOR THE MANUFACTURE OF A MEMBRANE ADAPTED FOR COUPLING TO A FABRIC, AND PRODUCT SO OBTAINED

(71) Applicants: Alice Zantedeschi, Verona (IT); Francesca Pievani, Chiuduno (IT)

(72) Inventors: Alice Zantedeschi, Verona (IT); Francesca Pievani, Chiuduno (IT)

( * ) Notice: Subject to any disclaimer, the term of this patent is extended or adjusted under 35 U.S.C. 154(b) by 264 days.

(21) Appl. No.: 16/963,356

(22) PCT Filed: Feb. 21, 2019

(86) PCT No.: PCT/IB2019/051430
§ 371 (c)(1),
(2) Date: Jul. 20, 2020

(87) PCT Pub. No.: WO2019/162880
PCT Pub. Date: Aug. 29, 2019

(65) Prior Publication Data
US 2021/0060910 A1    Mar. 4, 2021

(30) Foreign Application Priority Data
Feb. 22, 2018  (IT) .................. 102018000002939

(51) Int. Cl.
*B32B 27/12* (2006.01)
*B32B 27/20* (2006.01)
(Continued)

(52) U.S. Cl.
CPC ............ *B32B 27/12* (2013.01); *B32B 5/022* (2013.01); *B32B 7/12* (2013.01); *B32B 9/002* (2013.01);
(Continued)

(58) Field of Classification Search
CPC .......... B32B 5/022; B32B 5/024; B32B 7/12; B32B 9/002; B32B 9/025; B32B 27/12; B32B 27/18; B32B 27/20; B32B 27/304; B32B 27/322; B32B 27/40; B32B 37/0053; B32B 37/0076; B32B 37/025; B32B 37/1292; B32B 37/16; B32B 37/20; B32B 37/203; B32B 2037/268; B32B 38/164; B32B 2038/166; B32B 2038/168;
(Continued)

(56) References Cited

U.S. PATENT DOCUMENTS

2007/0142544 A1   6/2007  Jenkines
2019/0382953 A1*  12/2019  Kubo .................. D06N 3/0015

FOREIGN PATENT DOCUMENTS

CN   106 414 842   2/2017
CN   107 142 744   9/2017
(Continued)

OTHER PUBLICATIONS

International search report and written opinion dated May 29, 2019 for corresponding PCT patent application No. PCT/IB2019/051430.
(Continued)

*Primary Examiner* — Michael A Tolin

(57) ABSTRACT

Object of the present invention is a process for manufacturing a membrane adapted for coupling to a fabric or other supports that can be used in the field of the clothing or furnishing, and so-obtained product.

20 Claims, 1 Drawing Sheet

(51) Int. Cl.
  *B32B 27/40* (2006.01)
  *B32B 37/26* (2006.01)
  *B32B 5/02* (2006.01)
  *B32B 7/12* (2006.01)
  *D06N 3/00* (2006.01)
  *B32B 9/02* (2006.01)
  *B32B 37/00* (2006.01)
  *B32B 9/00* (2006.01)
  *B32B 38/00* (2006.01)

(52) U.S. Cl.
  CPC .............. *B32B 9/025* (2013.01); *B32B 27/20* (2013.01); *B32B 27/40* (2013.01); *B32B 37/025* (2013.01); *B32B 38/164* (2013.01); *D06N 3/0063* (2013.01); *D06N 3/0095* (2013.01); *B32B 2037/268* (2013.01); *B32B 2262/02* (2013.01); *B32B 2262/08* (2013.01); *B32B 2266/04* (2013.01); *B32B 2437/00* (2013.01); *B32B 2437/02* (2013.01); *B32B 2479/00* (2013.01); *B32B 2601/00* (2013.01); *B32B 2605/003* (2013.01); *B32B 2607/02* (2013.01); *D06N 2203/068* (2013.01)

(58) Field of Classification Search
  CPC ............ B32B 2250/02; B32B 2262/02; B32B 2262/0207; B32B 2262/06; B32B 2262/062; B32B 2262/08; B32B 2264/10; B32B 2264/104; B32B 2264/303; B32B 2266/04; B32B 2307/3065; B32B 2307/554; B32B 2307/7265; B32B 2318/04; B32B 2327/06; B32B 2327/18; B32B 2375/00; B32B 2437/00; B32B 2437/02; B32B 2479/00; B32B 2601/00; B32B 2605/003; B32B 2607/02; D06N 3/0063; D06N 3/0095; D06N 3/0097; D06N 2203/068; E04F 13/144
  See application file for complete search history.

(56) References Cited

FOREIGN PATENT DOCUMENTS

| CN | 107 700 234 | 2/2018 | | |
|---|---|---|---|---|
| WO | 20150015380 | 2/2015 | | |
| WO | WO-2018123290 A1 | * | 7/2018 | ............... D06N 3/00 |

OTHER PUBLICATIONS

Priority Search Report dated Oct. 26, 2018 for Italian priority application No. 102018000002939.

Kunal Singha: "A Reviewon Coating & Laminationin Textiles: Processes and Applications", American Journal of Polymer Science, vol. 2, No. 3, May 9, 2012.

Camilla Pisani: "A 26 anni inventa un nuovo tessuto con la polvere di marmo", Corriere Innovazione/News, Oct. 2, 2015 (Oct. 2, 2015), XP055519234, Italy.

* cited by examiner

Fig. 1
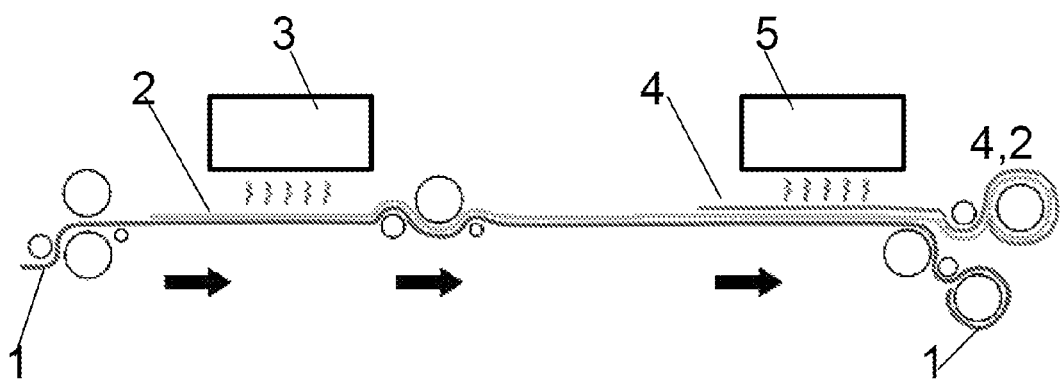
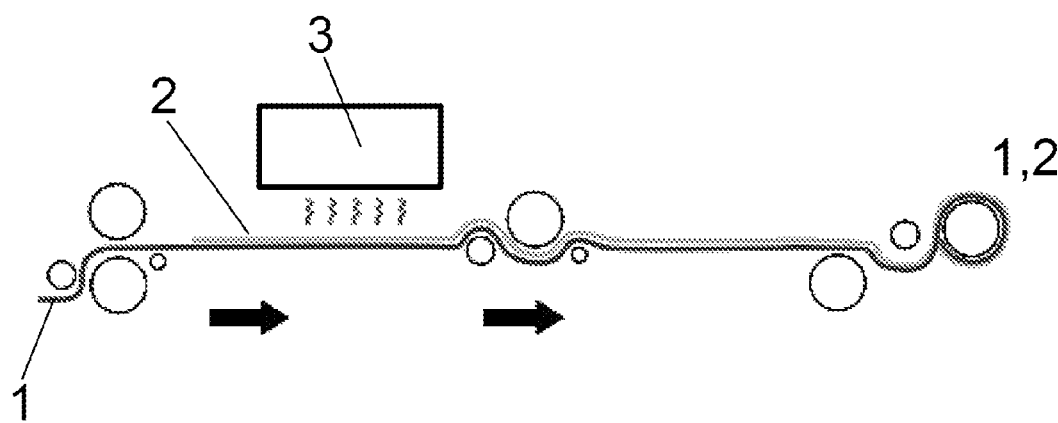
Fig. 2

PROCESS FOR THE MANUFACTURE OF A MEMBRANE ADAPTED FOR COUPLING TO A FABRIC, AND PRODUCT SO OBTAINED

This application is a U.S. national stage of PCT/IB2019/051430 filed on 21 Feb. 2019, which claims priority to and the benefit of Italian Application No. 102018000002939 filed on 22 Feb. 2018, the contents of which are incorporated herein by reference in their entireties.

TECHNICAL FIELD OF THE INVENTION

The present invention refers to a process for manufacturing a membrane adapted for coupling to a fabric, and product so obtained. The membrane comprises marble powder and polyurethane.

STATE OF THE ART

The fact that marble has already been source of aesthetic inspiration in the clothing field, because of its very particular natural colors and veins, is known. However, these aesthetic effects of "marbling" have been replicated on textile supports by more or less sophisticated printing techniques (mainly digital printing) in order to impart to the fabrics drawings and colors very similar to those of the marble. But this does not allow full sensory experience that only the natural material is able to confer to be actually reproduced.

On several occasions stylists and designers were inspired by the stone for their creations, focusing on the texture the material has by its nature and on the structural forms that can be transferred to a cloth or product. A line that communicates continuity over time, as the marble itself, for eternal fashion, which contradicts its very seasonal and frenetic essence.

Therefore, the marble in the fashion world was present as visual graphic inspiration and as a tool to transfer to cloths the sensations the material communicates.

The marble in the design and interior field is a material widely used and appreciated for its aesthetics, performance and its "status symbol". Here the material is used in its entirety, usually cut into slabs, worked starting from the block or as granulate for different applications. The limit of marble in these fields is the flexibility, as it is used in its classic shape and is heavy, static and rigid.

In the field of building and interior coverings, a project accomplished by the company Slate Lab® is known, which proposes natural, light and flexible stones constituted by an authentic thin layer of genuine stone placed on a glass or cotton fiber so to give extreme elasticity and strength to the finished product. The stone is applied in two modes, for the Slates by using the layer that you can get whereas, for the other types of stone, the marble effect design is reproduced by means of marble powder that is glued on crosslinked supports.

The marble is mainly made of calcium carbonate ($CaCO_3$), the carbonic acid salt, having a solid and white appearance, at room temperature. The calcium carbonate powder is poorly soluble in water, odorless, non-flammable, and is used in many production fields.

The U.S. Patent Application US 2014/0037890 A1 describes the use of calcium carbonate having nanometric dimensions to decrease the hydrolysis of polyurethane and the use of calcium carbonate having sub-micrometric dimensions ("SMGCC—submicron natural ground calcium carbonate"), in combination with acrylic resins, for making glossy and opacifying coverings, in order to obtain surface coverings conferring a glossy or opaque aspect to the products. Such coverings must be made directly on existing products.

The Italian Patent Application N. 1424946, filed on Jun. 27, 2014, describes a coupled product for clothing, comprising a flexible support in the form of fabric or coagulated support on which several layers based on polyurethane, having a loading of marble powder with granulometry not higher than 150 microns, are coupled. The composition of the known solution provides the use of marble powders having various granulometry ranging from 0 to 150 and in undefined percentage. The granulometry specified in the Patent Application turns out to be vague and difficult to manage as it can determinate the creation of cuts, lines and defects on the membrane and thus alter the performance of the material. Also, the membrane has a thickness that is not adequate to its correct production, as the presence of calcium carbonate can compromise and pierce the too thin microfilm. Furthermore, the process for manufacturing the membrane provides for making several coating layers of marble powder on a polyurethane base, thus resulting difficult to implement.

SUMMARY OF THE INVENTION

Therefore purpose of the present invention is to provide a process for manufacturing a membrane adapted to be coupled to a fabric or other supports that can be used in the clothing or furnishing field, and the product so obtained, aimed at overcoming all the aforementioned drawbacks.

The process object of the invention provides for making the membrane by blending powder of stone material, such as rocks or stones, for example marble powder, and a polymer, for example polyurethane, preferably in only one layer, with the possibility of adding any additional layer for protective use.

Possible multiple layers can have an increased protective effect, compared to the implementation with only one layer. Depending on the characteristics of the desired final product, the membrane can be made in a single layer or multiple layers.

The membrane object of the invention also meets the need to introduce performances relative to the abrasion resistance and the flame retardant capability. The rock powder, for example the marble powder, increases the abrasion resistance with respect to analogous membranes without the characteristic presence of rock powder, in particular marble powder, of the membranes according to the invention. In fact, if a powder with specific granulometry is used, i.e. the granulometry exemplified according to the present invention, the membrane does not split/generate defects and therefore it is more resistant to abrasion. The rock powder, in particular marble powder, confers higher abrasion resistance to the membrane according to the invention; the particular granulometry avoids the formation of membrane cuts, therefore it is the optimal solution to achieve the described performances. The fields of application of the novel membrane are adapted to get into different scenarios among which: clothing, footwear, accessories, upholstered products, interior design, complementary furniture, outdoor design, car wrappings, boating, means of transport, wall coverings.

Moreover, differently from what described in the Italian Patent Application mentioned above, the manufacturing process looks different, as it is possible not to make more than one coating layer of the marble powder and polyurethane blend, thus making possible to produce it in a single layer (and by a single passage). Furthermore, now it is also possible to use marble powder deriving from production waste.

According to the invention, it is proposed a product made of stone or rock powders and in general of stone material, preferably marble powder, also recovery marble, and the related manufacturing process by making a membrane, by a surface coating preferably in a single layer, which allows to develop coverings where the rock is used, preferably marble, bringing its aesthetic and technical characteristics.

It is an object of the present invention a membrane that can be coupled to fabrics or coagulated supports, comprising rock powder dispersed in a polymer or a polymer mixture, characterized in that the particles of said rock powder have a diameter between 1 µm and 100 µm. It is also an object of the present invention an article comprising such a membrane of the invention.

It is a further object of the present invention a process for manufacturing a membrane adapted for coupling to a fabric characterized in that it comprises the step of making said membrane as a blend of rock powder, preferably marble powder, and polymer, preferably polyurethane resin, or polymer mixture, said rock powder having granulometry of 0-50 µm and percentage of the membrane for example of at least 10% by weight. Different percentages and granulometry are possible, as will be discussed below.

It is also an object of the present invention a membrane comprising rock powder, for example obtained with said process, and an article, for example a fabric, comprising said membrane.

BRIEF DESCRIPTION OF THE FIGURES

Further purposes and advantages of the present invention will be clear from the following specification of an exemplary embodiment of the same (and variations thereof), and with reference to the attached drawings given purely by way of explication and without limitation, wherein:

in FIG. 1 is depicted a schematic diagram of embodiments of the manufacturing process of the membrane object of the present invention, in case of direct coupling to a fabric;

in FIG. 2 is depicted a schematic diagram of embodiments of the manufacturing process of the membrane object of the present invention, in case the coupling to a fabric is carried out at a later time.

The same reference numbers and letters in the figures identify the same elements or components.

DETAILED DESCRIPTION OF EXEMPLARY EMBODIMENTS

According to the present invention, by rock powder is meant a powder deriving from the crushing and/or milling of one or more rocks, preferably one or more rocks selected from the group constituted, for example, by marble, granite, quartz and onyx. According to a preferred aspect of the present invention, the rock powder is marble powder.

In the scope of the present invention, non-limiting examples of usable marble powders are: Verona Red ("Rosso Verona"), Garda Rose ("Rosa del Garda"), Mori Yellow ("Giallo Mori"), Ebony Black ("Nero Ebano"), Alps Green ("Verde Alpi"), Carrara White ("Bianco Carrara") and recovery powders being dried from sawing sludge of marble and agglomerates. In fact, advantageously the latter can be derived from the recovery of sludge capable of being excavated, i.e. the waste of the residual powder in the sawmills (where the blocks for making slabs are cut), normally implying high disposal costs. This sludge is composed of marble powder (or marble and other agglomerates) and water.

According to the present invention, in order to obtain a membrane having the aesthetic and technical effects described herein, the bulk of rock powder is constituted by particles having granulometry lower than 100 µm. Preferably, such particles have diameter between 1 and 100 µm, more preferably between 5 and 70 µm, even more preferably between 8 and 50 µm. The granulometry of the rock powder can also be in the range between 0 and 50 µm, wherein by the range 0-50 is meant to define a pool of marble particles passing through a 50 µm sieve. Analogously, is meant that the particles made of stone material having granulometry of 8-50 µm are particles passing through a 50 µm sieve and restrained by an 8 µm sieve.

The granulometry useful to produce the aesthetic and technical effects described herein can vary, in the limits cited above, depending on the type of rock powder used, for example on the type of marble powder used; specific granulometry ranges of marble powder useful according to the present invention are described below. It has been observed that the granulometry of the rock powder affects aesthetic and technical characteristics of the membrane of the present invention. For example, it has been observed that the glossy and opacifying effect described in the U.S. Patent Application cited above is not found in the membrane of the invention, when it comprises rock powder in the granulometry ranges reported herein. In fact, the glossy and opacifying effect of the membrane of the invention can be provided by the transfer paper, as will be described below.

The marble powder that is used can have different dimensions/granulometry depending on the type of marble used. In particular, the following granulometry ranges apply for the following types of marble:

Verona Red marble 30-40 µm
Ebony Black marble 30-40 µm
Mori Yellow marble 30 µm
Alps Green marble 30 µm
White marble 10-40 µm
dehydrated marble+resin sludge 8 µm in general, it is preferable that the maximum dimension of the powder particles is in the range of 40-50 microns.

According to the invention, a loading of rock powder is made together with a polymer or polymer mixture, preferably polyurethane, thus making a membrane in the liquid state at the beginning, which is then dried when passing under drying ovens making it dry and ready to be coupled with different types of fabric. The polymer or polymer mixture can be any polymer or mixture useful to prepare a membrane that can be coupled to a support. According to preferred embodiments, the polymer or polymer mixture is one or more polymers having a synthetic or plant nature, mainly selected from polyurethane (PU), polyvinylchloride (PVC) acrylic polymers and polytetrafluoroethylene (PTFE); preferably, the polymer is polyurethane, for example aliphatic polyurethane.

The type of membrane produced preferably has a single layer composed for example of polyurethane and marble powder blended and laid out on a supporting paper.

The marble powder can have granulometry lower than 50 µm, to avoid the granules creating an obstruction on a doctor blade which subsequently provides to spread the layer of the mixture, or blend, on transfer paper. It has been found that this also happens with the particles having the previously described diameters.

The percentage of rock powder added into the membrane can vary depending on the type of rock powder used, for example on the type of marble used. According to preferred aspects, the percentage of rock powder comprised in the membrane can range from 3% to 50% by weight to the total weight of the membrane, preferably from 5% to 30% by weight, more preferably it is 10% or 15% by weight, but different percentages can be used.

The maximum percentage of marble powder added is preferably 15% by weight of powder to the total weight of the membrane, but the percentage can also vary depending on the size of the marble powder, if powder of about 30 μm is used, the percentage used is about 10%. By increasing the powder amount the results are a less transpirant membrane and a touch and fit effect less elastic and more "crunchy". By increasing the powder size the results are inhomogeneity and the risk of piercing or scratching the membrane.

During the final drying, particular catalyst additives are preferably activated, which have the purpose of reinforcing the bonds and increasing the resulting adhesion.

At the end of this processing, the transfer paper is detached from the resulting membrane, which can thus be coupled to the fabric.

The result of the processing is thus constituted by a support, for example a support made of fabric (conferring the mechanical characteristics), and one layer made of rock powder, for example marble powder, and polymer, for example polyurethane, which imparts the aesthetic and technical characteristics. The membrane is coupled to the fabric for example by glue, allowing the adhesion of the two edges (support and membrane), which then become indissoluble.

A conventional fabric can be used as a support, possibly elasticized with natural or artificial fibers, or a combination of the previous ones, or else a "coagulated support": by the latter term is meant any flexible layer acting as a support in the field of the clothing, interior, footwear, furnishing, clothing accessories and other fields mentioned above, such as a non-woven fabric, Lycra jersey, leather, imitation leather, etc. The membrane can have different types of fabrics and they can be non-coupled. Furthermore, it is possible to sew additional materials together and/or heat-seal sews to maintain complete impermeability in the final products. The membrane can be used with an internal, external layer or as an intermediate layer in materials having 3 or more layers. Therefore, the support comprising the membrane of the invention constitutes an article, which is itself also an object of the present invention. Preferably, the article comprises at least one surface, and such a surface is in contact, at least partially, with the membrane of the invention. The part of the article surface that is in contact with the membrane shows the aesthetic and technical effects described in the present invention.

The thickness of the membrane, when it is coupled to a fabric intended for a cloth, such as for example a jacket, is typically 30+/−5 μm and its weight is equal to 30+/−5 g/m². More in particular, with reference to FIG. 1, the polymer blend 2, for example made of polyurethane resin and rock powder, for example marble, is applied on the transfer paper 1 for example by doctor blade spreading and is thus passed through the drying oven 3. Then, to the membrane still comprising the transfer paper, a fabric 4 is coupled by gluing, for example spot gluing or complete gluing; the gluing can provide the addition of a glue in spots or on the entire surface of the membrane. The assembly can subsequently be passed in a calender that stabilizes the coupling even thanks to the pressure and that can exert different pressures depending on the desired effect. Thus, the coupling of the fabric and membrane is separated from the transfer paper 1, which, for example, can be recovered and rewound for reuse.

With reference to FIG. 2, the coupling step to a fabric can be carried out at a later time. Following the passage in the first drying oven 3, the membrane 2 coupled to the transfer paper 1 can be wound and preserved for later use for coupling to the fabric.

The thickness of the membrane can also be higher and can be for example 200 μm, in particular when it is coupled to a support intended for furnishing, such as for example a sofa. In such a case, the membrane is prepared and coupled as previously described, with the difference that the blend may need to be applied in several layers on the transfer paper.

Introducing the rock powder, for example the marble powder, in the production of the material allows the membrane to take a special base color, depending on the type of rock used. The addition of colored pigments helps the membrane to achieve shiny shades and a particular and bright color. In general, the marble color can be further defined by the presence of minerals defined idiochromatic or by the presence of various pigmentations having inorganic and organic nature. The idiochromatic minerals always have the same color still containing some impurities: so calcite, dolomite and in part quartz give the stone a white or slightly greyish color; chlorite and antigorite bring a greenish-green color; whereas pyroxenes and micas characterize the rocks having black color. Instead, the subject related to pigmentations is more complex because we must take into account the genesis of the rocks. In the rocks of sedimentary origin the inorganic pigments are generally associated with the clay component of the rock itself: the most widespread are iron oxides, that give yellow colors if the pigment is limonitic (FeOOH), such as in different limestones including Verona Yellow ("Giallo Verona"), or else lead the rock to a color tending to red if the pigment is hematitic ($Fe_2O_3$) such as in the Verona Red.

The tactile effect that is perceived from the novel membrane is very particular and reminds the talc effect that the calcium carbonate powder offers when it is in micro-granulates. The soft and almost velvety hand is given both by the type of transfer paper used in the process of making the film, and the contribution of the rocks, for example the calcium carbonate, a constituent element of marble for its almost totality. It is found that the calcium carbonate gives a softer and more velvety hand, thus accentuating the effect of the Velvet paper used specifically for the membrane production. It is possible to select papers that give a more glossy effect or else more opaque effect to the membrane; preferably the material mentioned herein is produced with opaque velvet paper.

The characteristics of the novel membrane are divided in aesthetic performances, such as hand and visual effect, and high technical performances.

Thanks to the polymer support, for example polyurethane, the material of the membrane is impermeable and able to retain, for example, a water column lower than or equal to 5,000 mm according to EN ISO 20811 test. The air passage is lower than or equal to 1 mm/s, measured according to EN ISO 9237 test method, conferring the windproof performance to the membrane. Although it can be a polyurethane membrane (material that is usually non-transpirant), the membrane manages to have a good transpiration index (Ret), lower than or equal to 40 m² Pa/W according to EN ISO 31092 test. Furthermore, the membrane can be defined flame retardant, measured according to the Cigarette Test, BS 5852-1 (1979) certification method, and thus it will be possible to use the material as covering in the interior field.

By means of its composition and the addition of additives, the membrane can further increase this flame retardant characteristic, in order to be flexible to different fields of application.

A textile product, in relation to the use it is intended for, is subjected to wearing: it is therefore important to be able to determine the resistance that this has towards the abrasion. There are many factors that influence this resistance: the physical-mechanical characteristics of the fibers, the compactness of the fabric, the type of surface depending on the finishing process applied, the presence of any non-fibrous substance such as resins, dressings, softening products and so on.

The abrasion resistance is determined by means of apparatuses called abrasion testers or wear-resistance testers. There are many types that have operating principles also very different from each other and that intend to idealize the conditions of use of the fabric.

In order to be able to analyze the novel membrane, the Martindale type abrasion tester was used, which is by far the most used and that for which the normative references are the most numerous. Based on that, the method using this type of equipment is also that where it was possible to better define the quality standards of various fabrics in relation to their intended use. The Martindale abrasion tester is provided with four or six work stations that must possibly be all exploited for a single test, because the behavior of the single specimens is not always very homogeneous. A specimen of the textile product to be examined, mounted in a specimen holder and subjected to a defined load, is rubbed against a standard abrading fabric with a translatory movement that reproduces the Lissajous pattern.

To perform the test, proceed as follows.

A standard felt and a piece of standard abrading fabric are placed on each rubbing surface of each abrasion table and are locked with the appropriate ring nut, making sure the abrading fabric is flat and without folds.

Circular specimens of the fabric to be analyzed are made, a circular sample of standard polyurethane foam is combined with the back of each specimen and everything is assembled in the specimen holder of the abrasion tester.

The so-prepared specimen holders are placed and fixed on the abrasion tables be means of appropriate rods on which the weight suitable for the intended use of the fabric to be tested is placed. 9 KPa weight will be used if the fabric is intended to clothing and 12 KPa weight will be used if the fabric is intended for technical uses, for furnishing, for manufacturing work clothes or bed linen.

The apparatus is thus operated and subsequently stopped to evaluate the specimens at defined time intervals, which are variable as a function of the resistance of the fabric or the applied technical regulation or the methodological variables that may be present in the same regulation.

In general the test ends:
when breakage occurs of at least two yarns for orthogonal fabrics (three in case of fabrics intended for furnishing) and one yarn for the knit fabrics or else, for the non-woven fabrics, when the formation of a hole having diameter of at least 0.5 mm occurs;
when the total uncovering of the weave or the base occurs respectively for the velvet-type fabrics and the pile fabrics. The evaluation of the specimens also takes into account significant changes in appearance such as for example:
the formation of dots on the surface.
the partial uncovering of the fabric weave.
the total uncovering of the fabric weave with no nap but with covered weave such as clothes, velour, mouflon etc.
the change in color of the fabric.
other changes deemed detrimental to the appearance or structure of the fabric. With this method it is also possible to determine the mass loss of the fabric following the abrasion.

By carrying out the test on the membrane, excellent resistance to abrasion was found also at 200,000 revolutions, when usually for the clothing a good resistance is considered to be 10,000 revolutions and for technical membranes 50,000 revolutions, whereas in furnishing a good resistance is considered to be 100,000 revolutions.

Other characteristics of the novel membrane are referring to its property of being non-sticky and washable with water (30°) and by dry cleaning. The material must not be ironed directly, but once it is coupled to a fabric or other support, it will be sufficient to use an iron at low temperatures on this side.

All of these characteristics allows a completely novel and original product both in terms of performance and composition to be obtained.

In fact, it is possible to obtain a product or coupled membrane for manufacturing clothes and coverings of various nature, in which the rock powder is actually used in a flexible, light and innovative way.

The particular manufacturing process that has been fine-tuned allows the rock powder material to be introduced in a fabric/composite membrane, thus providing innovative technical, chromatic, tactile and aesthetic solutions, for the composition of clothes and coverings.

Further details of non-limiting examples of manufacturing process according to the invention are described below.

A first example is related to the clothing field of use. The recipe of products to be used provides:
For producing about 400 MT membrane:
80 kg POLYURETHANE+TOLUENE mixture (for example produced by the company Baxender®) composed of 70% PU and 30% Toluene
15 kg WASTE MARBLE (8 μm) or about 10 kg marble powder with dimension of about 30 μm
640 g FR118 IGNIF. for fireproof component
1.5 kg Black Color 11/C or other liquid colors, depending on the marble/membrane color that we want to make
1 kg IRIODIN MINATEC 230 AIR or other powder color, depending on the marble/membrane color that we want to make
5 kg Toluene (in addition to that already present in the LS blend)

It is possible to add an anti-bacterial component on the membrane. After this blend is filtrated, for example by a RMO 250 PA filter with holes having granulometry of 250 microns, in order to remove the biggest parts and components that otherwise could deposit on the bottom and, once the blend is laid out in the spreading plant, make the membrane not homogeneous.

Then the blend is laid out on the plant and the doctor blade has the task of leveling the desired thickness: in this case 30+/−5 μm; whereas the total weight of the membrane is 30+/−5 g/m². However the weight and thickness can vary depending on the cases.

The membrane produced is the result of a single layer of the blend laid out on velvet paper (cardboard on which the film is spread, that can be glossy, opaque, soft, etc.) and subsequently it is dried in the plant oven which is evaporating possible solvents. Velvet paper with opaque finish, but also glossy or other types of paper, depending on the need, can be used.

The next step consists in coupling the membrane with any fabric or support, for example coagulated support. For example the fabric can be cotton, neoprene, wool, cashmere, organza, nautical canvas, Lycra, but other supports can also be used.

The membrane can be coupled already immediately after being produced, and once it is coupled it is preferable to let it stand 3 to 7 day, wound on the reel. Or else, as seen above, the coupling to the fabric can occur afterwards.

The coupling of the membrane to the fabric can occur according to two modes: spot glue or FORMAT, i.e. full field. The spot coupling is lighter.

The glue used has also 6% fireproof component. The glue used is for example of the transpirant drop 359 type.

The performance characteristics obtained are the following:
Impermeable: ≥5,000 mm EN ISO 20811
Transpirant (RET): ≤40 $m^2$ Pa/W EN ISO 31092 Windproof: ≤1 mm/sec EN ISO 9237
Abrasion resistant: 150,000 cycles, Martindale test, above.
Fireproof: "Cigarette" test above, positively passed.
Color: color base given by the type of marble selected, but dyes can be added to revive the color or modify it.
Hand: the soft tactile effect is given by the calcium carbonate composing the marble and by the type of paper used (velvet paper in our case)
Non sticky and very resistant to the abrasion, washable with water and by dry cleaning.
The melting point of the membrane is 180°.
The membrane can be heat-sealed. It is possible to print on the membrane.

A second example is related to the nautical use field. Only details different from what mentioned above for the first example are described.

The recipe of products to be used provides:
45/60% dry polyurethane, for example produced by the company Baxender® 25/40% Ethyl acetate
15% waste marble (8 μm)—10% is also possible in case other types of marbles having granulometry higher than 8 μm are used.
Filtration as above.

Then the blend is laid out on the plant and the doctor blade has the task of leveling the desired thickness: in this case 30+/−5 μm; the total weight of the membrane is 30+/−5 g/$m^2$.

For the nautical field a thicker, for example of 200 μm, or different membrane can be provided depending on the needs. The more the membrane is thin, the more is light and elastic, whereas if it is thicker the membrane is more firm and rigid.

The membrane produced is a result of a single layer or multi-layer of blend, to ensure higher resistance.

The next coupling step of the membrane with any fabric, as above.

With respect to the production of the membrane for the clothing field, very few parameters vary, such as temperature and the air for evaporating the solvents, as we must use membranes with different polyurethane blends, such as types with the characteristic of not being transpirant and better with regards to impermeability. The performance characteristics obtained can be the following:

Impermeable: ≥10,000 mm EN ISO 20811 (higher than clothing)
Transpirant (RET): ≤NON-TRANSPIRANT Windproof: ≤1 mm/sec EN ISO 9237
Abrasion resistant: 150,000 cycles, Martindale test
Fireproof: within the blend there is the same additive as in the clothing field.
Color: color base given by the type of marble selected, but dyes can be added to revive the color or modify it.
Hand: the soft tactile effect is given by the calcium carbonate composing the marble and by the type of paper used (velvet paper in our case)
Non sticky and very resistant to the abrasion, washable with water and by dry cleaning. The marble powder used is as above.

The resulting finished product is a membrane with the marble powder inside. This membrane has higher shielding and is more suitable to the nautical field, being non-transpirant.

A third example is related to the field of use for interior/exterior furnishing. Only details different from what mentioned above for the first example are described.

The recipe of the products to be used provides, according to the needs:
Mixture of polyurethane suitable for the use in the clothing field+marble powder (see above), or else
Mixture of non-transpirant polyurethane+marble powder (see above), or else
Mixture of polyurethane suitable for furnishing+marble powder (see above).

For example the company Baxender® supplies different polyurethane blends that can be used for the invention.
Filtration as above.

Then the blend is laid out on the plant and the doctor blade has the task of leveling the desired thickness: in this case between 30 and 200 microns; the total weight of the membrane is 30+/−5 g/$m^2$.

Following steps as above.

The performance characteristics obtained are the following:
Impermeable: ≥5,000 mm EN ISO 20811
Transpirant (RET): ≤40 $m^2$ Pa/W EN ISO 31092 Windproof: ≤1 mm/sec EN ISO 9237
Abrasion resistant: 150,000 cycles, Martindale test
Fireproof: "Cigarette" test above, positively passed.
The marble powder used is as above.

The resulting finished product is a membrane with the marble powder inside. This membrane has higher shielding and is more suitable to the interior/exterior furnishing field, being non-transpirant. Depending on the direct use, a more transpirant membrane can also be selected. The membrane produced is a result of a single layer or multi-layer of blend, to ensure higher resistance.

Implementation variations of the non-limiting example described are also possible, without departing from the scope of protection of the present invention, comprising all the equivalent implementations for a person skilled in the art.

The elements and characteristics set forth in the different preferred embodiments can be combined to each other without however departing from the scope of protection of the present invention.

From the above mentioned description the art technician is able to achieve the object of the invention without introducing further construction details.

The invention claimed is:
1. A process for manufacturing a membrane adapted for coupling to fabrics or coagulated supports, comprising:

providing powder of rock material selected from the group consisting of marble, granite, quartz, and onyx, the particles of said rock powder having a diameter between 1 and 100 µm, forming a membrane layer comprising said rock powder dispersed in a polymer or a polymer mixture, wherein the amount of said rock powder is between 3% and 50% by weight of the total weight of said membrane layer, and coupling said membrane layer to a transfer paper.

2. The process according to claim 1, wherein the amount of rock powder is between 10% and 15% by weight of the total weight of said membrane layer.

3. The process according to claim 1, further comprising:
coupling said membrane layer to said transfer paper by applying a blend of said rock powder and polymer or polymer mixture on said transfer paper to form a layered material; and drying said layered material in a drying oven to obtain said membrane layer coupled to said transfer paper.

4. The process according to claim 1, further comprising coupling said membrane layer to a fabric or coagulated support by gluing said membrane layer to said fabric or coagulated support.

5. The process according to claim 4, wherein said fabric is a fabric with natural or artificial fibers, or a combination thereof, and said coagulated support is selected from the group consisting of non-woven fabric, Lycra jersey, leather, and imitation leather.

6. The process according to claim 1, further comprising:
coupling one or more membrane layers to said transfer paper by applying a blend of said rock powder and polymer or polymer mixture in one or more layers on said transfer paper to form a first layered material;

drying said first layered material in a drying oven;

coupling said first layered material to a fabric or coagulated support by gluing said first layered material to said fabric or coagulated support to form a second layered material;

drying said second layered material in a calender adapted to stabilize the coupling between said first layered material and said fabric or coagulated support; and separating said transfer paper from said second layered material.

7. The process according to claim 1, wherein said rock powder is marble powder.

8. A membrane adapted for coupling to fabrics or coagulated supports, comprising:
a membrane layer comprising powder of rock material selected from the group consisting of marble, granite, quartz, and onyx, dispersed in a polymer or a polymer mixture, and a transfer paper adjacent to the membrane layer, characterized in that the particles of said rock powder have a diameter between 1 µm and 100 µm, wherein the amount of said rock powder is between 3% and 50% by weight of the total weight of said membrane layer.

9. The membrane according to claim 8, wherein said rock material is one or more marbles selected from the group consisting of Verona Red, Garda Rose, Mori Yellow, Ebony Black, Alps Green, Carrara White and recovery powders recovered from sawing sludge of marble.

10. The membrane according to claim 8, wherein the particles of said rock powder have a diameter between 8 and 50 µm.

11. The membrane according to claim 8, wherein the amount of said rock powder is between 10% and 15% by weight of the total weight of said membrane layer.

12. The membrane according to claim 8, wherein said polymer or polymer mixture comprises one or more polymers selected from the group consisting of polyurethane (PU), polyvinylchloride (PVC) and polytetrafluoroethylene (PTFE).

13. The membrane according to claim 8, wherein a thickness of said membrane layer is between 30 and 200 microns and a total weight of said membrane layer is 25 g/m$^2$ to 35 g/m$^2$.

14. The membrane according to claim 8, wherein said membrane layer comprises a single layer.

15. An article comprising the membrane according to claim 8 and a support.

16. The article according to claim 15, wherein said article comprises at least one surface and said membrane is in contact with and/or adheres to at least part of said at least one surface.

17. The article according to claim 16, wherein said support is a fabric or a coagulated support.

18. The article according to claim 17, wherein said fabric is a fabric with natural or artificial fibers, or a combination thereof, and said coagulated support is selected from the group consisting of non-woven fabric, Lycra jersey, leather and imitation leather.

19. The article according to claim 15, wherein said article is an article in a field selected from the group consisting of clothing, interior, footwear, furnishing, clothing accessories, furniture, outdoor design, car wrappings, boating, and wall coverings.

20. A fabric material comprising a fabric coupled to a membrane according to claim 8.

\* \* \* \* \*